(12) United States Patent
Sutton (10) Patent No.: US 10,255,568 B2
(45) Date of Patent: Apr. 9, 2019

(54) METHODS AND SYSTEMS FOR SELECTING A DATA TRANSMISSION PATH FOR NAVIGATING A DYNAMIC DATA STRUCTURE

(71) Applicant: TIBCO Software Inc., Palo Alto, CA (US)

(72) Inventor: Nathan D. Sutton, Palo Alto, CA (US)

(73) Assignee: TIBCO SOFTWARE INC., Palo Alto, CA (US)

( * ) Notice: Subject to any disclaimer, the term of this patent is extended or adjusted under 35 U.S.C. 154(b) by 377 days.

(21) Appl. No.: 14/919,493

(22) Filed: Oct. 21, 2015

(65) Prior Publication Data

US 2017/0116261 A1  Apr. 27, 2017

Related U.S. Application Data

(63) Continuation of application No. 13/104,325, filed on May 10, 2011, now abandoned.

(60) Provisional application No. 61/333,226, filed on May 10, 2010.

(51) Int. Cl.
*G07F 17/30* (2006.01)
*G06Q 10/06* (2012.01)

(52) U.S. Cl.
CPC .............................. *G06Q 10/06311* (2013.01)

(58) Field of Classification Search
CPC combination set(s) only.
See application file for complete search history.

(56) References Cited

U.S. PATENT DOCUMENTS

| | | | |
|---|---|---|---|
| 5,765,140 A | 6/1998 | Knudson et al. |
| 5,963,911 A | 10/1999 | Walker et al. |
| 6,049,776 A | 4/2000 | Donnelly et al. |
| 6,308,163 B1 | 10/2001 | Du et al. |
| 6,445,968 B1 | 9/2002 | Jalla |
| 6,850,895 B2 | 2/2005 | Brodersen et al. |
| 7,881,957 B1 | 2/2011 | Cohen et al. |
| 8,046,307 B2 | 10/2011 | Habichler et al. |

(Continued)

FOREIGN PATENT DOCUMENTS

WO   WO 2004102431   11/2004

OTHER PUBLICATIONS

Search Report for EP11781125.7, dated Jul. 24, 2015.
PCT/US11/35879, Search Report and Written Opinion of the International Searching Authority dated Nov. 23, 2011.

*Primary Examiner* — Etienne P Leroux
(74) *Attorney, Agent, or Firm* — McGuireWoods LLP (57) ABSTRACT

Embodiments are directed to selecting a data transmission path, comprising receiving a query having attribute(s), extracting the attribute(s) from the query, performing a search in a dynamic data structure for target(s) associated with the attribute(s), identifying a first set of target(s), and transmitting a data item to each target of the first set. The method further comprises determining whether the dynamic data structure has transformed from a first state to second state, and when a transformation is determined, performing a second search in the dynamic data structure, identifying a second set of target(s), and transmitting the data item to each target of the second set. The transmitting comprises pushing, to a first target, an option to select the data item, and pushing, to a second target, an option to select the data item when the data item is not selected by the first target.

7 Claims, 6 Drawing Sheets

(56) References Cited

U.S. PATENT DOCUMENTS

| | | | |
|---|---|---|---|
| 2002/0040313 A1* | 4/2002 | Hunter | G06Q 10/06 705/7.13 |
| 2002/0059201 A1 | 5/2002 | Work | |
| 2002/0123921 A1 | 9/2002 | Frazier | |
| 2002/0147801 A1 | 10/2002 | Gullotta et al. | |
| 2003/0105656 A1* | 6/2003 | Thengvall | G06Q 10/02 705/7.21 |
| 2003/0177052 A1* | 9/2003 | Smith, III | G06Q 10/063112 705/7.14 |
| 2005/0125274 A1 | 6/2005 | Nastacio et al. | |
| 2006/0059032 A1 | 3/2006 | Wong et al. | |
| 2007/0157129 A1* | 7/2007 | Facemire | G06F 17/30554 |
| 2008/0201191 A1 | 8/2008 | Carter | |
| 2009/0030927 A1 | 1/2009 | Cases et al. | |
| 2011/0040764 A1* | 2/2011 | Duchon | G06Q 10/04 707/738 |
| 2011/0071875 A1* | 3/2011 | Stenhaug | G06Q 10/06 705/7.36 |
| 2013/0297060 A1* | 11/2013 | Sundling, Jr. | G06Q 10/0631 700/100 |
| 2014/0122142 A1* | 5/2014 | Podgurny | G06Q 10/06 705/7.13 |
| 2014/0129471 A1* | 5/2014 | Howard | G06Q 10/1053 705/321 |
| 2014/0244329 A1* | 8/2014 | Urban | G06Q 10/063114 705/7.15 |

\* cited by examiner

METHODS AND SYSTEMS FOR SELECTING A DATA TRANSMISSION PATH FOR NAVIGATING A DYNAMIC DATA STRUCTURE

TECHNICAL FIELD

This disclosure generally relates to navigating dynamic data structures.

BACKGROUND

Organizations may be made up of several organizational units having several organizational positions within each organizational unit. Hundreds or thousands of employees of an organization may hold the same organizational position in one or more organizational units located at different geographic locations. On a daily basis, an organization may have thousands of works items to assign to its employees.

Typically, organizations allocate the work to its employees using a queue system where the next work item in the queue is allocated to an employee who has availability to work on the work item. However, this method of allocating work has several drawbacks. For example, the employee who receives the work may not have the requisite skill set to perform the work item. In another example, a complicated work item may get assigned to a worker with little experience that could be handled more efficiently by an employee with several years of experience, and a simple work item may get assigned to a worker with several years experience that could be handled more efficiently by an employee with little experience. Further, the traditional methods for assigning work do not include an automated method for assigning work items to employees based on the attributes associated with its employees. As a result, it may be difficult and inefficient to locate a particular employee in the organization who has the attributes required to handle a particular work item. The need has arisen to provide an automated, efficient, and flexible method for allocating and/or offering particular work items to the appropriate workers.

SUMMARY

Disclosed are embodiments of systems and methods for selecting a data transmission path for navigating a dynamic data structure. Example embodiments may comprise providing a server. Example embodiments of the server may comprise the dynamic data structure and an analysis module. Example embodiments of the dynamic data structure may comprise information of one or more targets and one or more attributes associated with the one or more targets. Example embodiments may further comprise receiving a query at the server. Example embodiments of the query may comprise one or more attributes indicating criterion for transmitting a particular data item to one or more targets. Example embodiments may further comprise extracting, by the analysis module, the one or more attributes from the received query. Example embodiments may further comprise performing a first searching, by the analysis module, in the dynamic data structure for one or more targets associated with the attributes extracted from the query. Example embodiments may further comprise identifying, by the analysis module, a first set of one or more targets associated with the attributes extracted from the query based on the first searching. Example embodiments may further comprise transmitting, by the analysis module, the particular data item to each target of the first set of one or more targets identified, by the analysis module, as being associated with the one or more attributes extracted from the query. Example embodiments may further comprise determining, by the analysis module, whether the dynamic data structure has transformed from a first state to a second state. In response to a determination that the dynamic data structure has transformed from the first state to second state, example embodiments may further comprise performing a second searching, by the analysis module, in the dynamic data structure. Example embodiments may further comprise identifying, by the analysis module based on the second searching, a second set of one or more targets associated with the attributes extracted from the query. Example embodiments may further comprise transmitting, by the analysis module, the particular data item to each target of the second set of one or more targets identified, by the analysis module, as being associated with the one or more attributes extracted from the query. Example embodiments of the transmitting of the particular data item to the first set of one or more targets may comprise pushing, to a first identified target in the first set of one or more identified targets associated with the attributes defined in the query, a first notification of an option to select the particular data item within a first finite time period, the selection of the particular data item being made for processing the particular data item. Example embodiments of the transmitting of the particular data item to the first set of one or more targets may further comprise pushing, to a second identified target in the first set of one or more identified targets associated with the attributes defined in the query, a second notification of an option to select the particular data item when the particular data item is not selected by the first identified target within the first finite time period, the selection of the particular data item being made for processing the particular data item.

In another exemplary embodiment, logic for selecting a data transmission path for navigating a dynamic data structure is disclosed. Example embodiments of the logic may be embodied in a non-transitory computer-readable medium and when executed operable to receive a query. Example embodiments of the query comprise one or more attributes indicating criterion for transmitting a particular data item to one or more targets. Example embodiments of the logic may be further operable to extract the one or more attributes from the received query. Example embodiments of the logic may be further operable to perform a first search in the dynamic data structure for one or more targets associated with the attributes extracted from the query. Example embodiments of the logic may be further operable to identify a first set of one or more targets associated with the attributes extracted from the query based on the first searching. Example embodiments of the logic may be further operable to transmit the particular data item to each target of the first set of one or more targets identified as being associated with the one or more attributes extracted from the query. Example embodiments of the logic may be further operable to determine whether the dynamic data structure has transformed from a first state to a second state. In response to a determination that the dynamic data structure has transformed from the first state to the second state, example embodiments of the logic may be further operable to perform a second search in the dynamic data structure. In response to a determination that the dynamic data structure has transformed from the first state to the second state, example embodiments of the logic may be further operable to identify, based on the second searching, a second set of one or more targets associated with the attributes extracted from the query. In response to a determination that the dynamic data structure has transformed from the first state to the second state, example embodiments of the logic may be further operable to transmit the particular data item to each target of the second set of one or more targets identified as being associated with the one or more attributes extracted from the query. Example embodiments of the transmitting the particular data item to the first set of one or more targets may comprise pushing, to a first identified target in the first set of one or more identified targets associated with the attributes defined in the query, a first notification of an option to select the particular data item within a first finite time period, the selection of the particular data item being made for processing the particular data item. Example embodiments of the transmitting the particular data item to the first set of one or more targets may further comprise pushing, to a second identified target in the first set of one or more identified targets associated with the attributes defined in the query, a second notification of an option to select the particular data item when the particular data item is not selected by the first identified target within the first finite time period, the selection of the particular data item being made for processing the particular data item.

In another exemplary embodiment, a system for selecting a data transmission path for navigating a dynamic data structure is disclosed. Example embodiments of the system may comprise a memory. Example embodiments of the memory may comprise the dynamic data structure. Example embodiments of the system may further comprise a processor in communication with the data structure. Example embodiments of the processor may be operable to receive a query. Example embodiments of the query may comprise one or more attributes indicating criterion for transmitting a particular data item to one or more targets. Example embodiments of the processor may be further operable to extract the one or more attributes from the received query. Example embodiments of the processor may be further operable to perform a first search in the dynamic data structure for one or more targets associated with the attributes extracted from the query. Example embodiments of the processor may be further operable to identify a first set of one or more targets associated with the attributes extracted from the query based on the first searching. Example embodiments of the processor may be further operable to transmit the particular data item to each target of the first set of one or more targets identified as being associated with the one or more attributes extracted from the query. Example embodiments of the processor may be further operable to determine whether the dynamic data structure has transformed from a first state to a second state. In response to a determination that the dynamic data structure has transformed from the first state to the second state, example embodiments of the processor may be further operable to perform a second search in the dynamic data structure. In response to a determination that the dynamic data structure has transformed from the first state to the second state, example embodiments of the processor may be further operable to identify, based on the second search, a second set of one or more targets associated with the attributes extracted from the query. In response to a determination that the dynamic data structure has transformed from the first state to the second state, example embodiments of the processor may be further operable to transmit the particular data item to each target of the second set of one or more targets identified as being associated with the one or more attributes extracted from the query. Example embodiments of the transmitting the particular data item to the first set of one or more targets may comprise pushing, to a first identified target in the first set of one or more identified targets associated with the attributes defined in the query, a first notification of an option to select the particular data item within a first finite time period, the selection of the particular data item being made for processing the particular data item. Example embodiments of the transmitting the particular data item to the first set of one or more targets may further comprise pushing, to a second identified target in the first set of one or more identified targets associated with the attributes defined in the query, a second notification of an option to select the particular data item when the particular data item is not selected by the first identified target within the first finite time period, the selection of the particular data item being made for processing the particular data item.

In certain embodiments, the systems and methods may search the organizational model for a new set of one or more individuals associated with the one or more attributes defined in the previously received query, if the organizational model is modified and the work item has not been allocated to an individual. The systems and methods may offer the unallocated work item to one or more individuals associated with the one or more attributes who were not identified in the previously received query. The systems and methods may also automatically allocate one or more work items to the one or more individuals associated with the one or more attributes, as the one or more individuals become available to work on the one or more work items.

The present disclosure provides several important technical advantages. In certain embodiments, the present disclosure can accurately identify the particular individuals that are most appropriate to complete the work required at the time the work is processed. The present disclosure can easily and efficiently identify who is qualified to perform a particular piece of work. Further, the present disclosure can define the criteria or attributes for an individual to work on a particular work item at the time the work item is defined or created. The present disclosure also allows one to define abstract criteria or attributes that can then be used to identify individuals in similar parts of large organizations having many branch offices. The present disclosure further provides for the possibility to find an individual to perform the work item by combining particular privileges, skill sets, or capabilities of individuals with the organizational position(s) they hold. Combining privileges, skill sets, or capabilities of individuals with elements of the organizational model provides a very powerful tool for identifying the most appropriate individuals to best work on a work item in the most effective and efficient manner.

Further technical advantages include optimizing the time and abilities of individuals working for an organization. The present disclosure allows for work items to be offered or allocated to specifically targeted individuals having particular attributes. The present disclosure allows for skilled and specialist individuals to receive assignments or offers for particular work items associated with their skills and specializations. Similarly, the present disclosure allows for less skilled and less specialized individuals to receive assignments or offers for particular work items requiring less skill or specialization, such that the more skilled or specialized workers do not spend their time on these work items requiring less skill or specialization. Thus, the present disclosure ensures that the appropriate individuals who should be performing the work are allocated the work as opposed to allocating the work to any individual who may be capable of doing the work.

The present disclosure also provides the ability to allocate or offer work items to particular units or locations of an organization. Targeting individuals at a particular office location to handle a work item may be desirable. Further, the distribution rules for work items are defined in the queries, which are defined in terms of the organization, which reflects the natural way of distributing work items to the most appropriate individuals working in the organization. Further, workers at the organization only work on work items that are directly appropriate for them, which leads to efficiencies and better work product. The present disclosure allows for companies to streamline processes of all levels of complexity and predictability and enable organizations to improve the way employees, customers, partners, enterprise applications, and web services work together to execute processes and transactions that define an organization.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
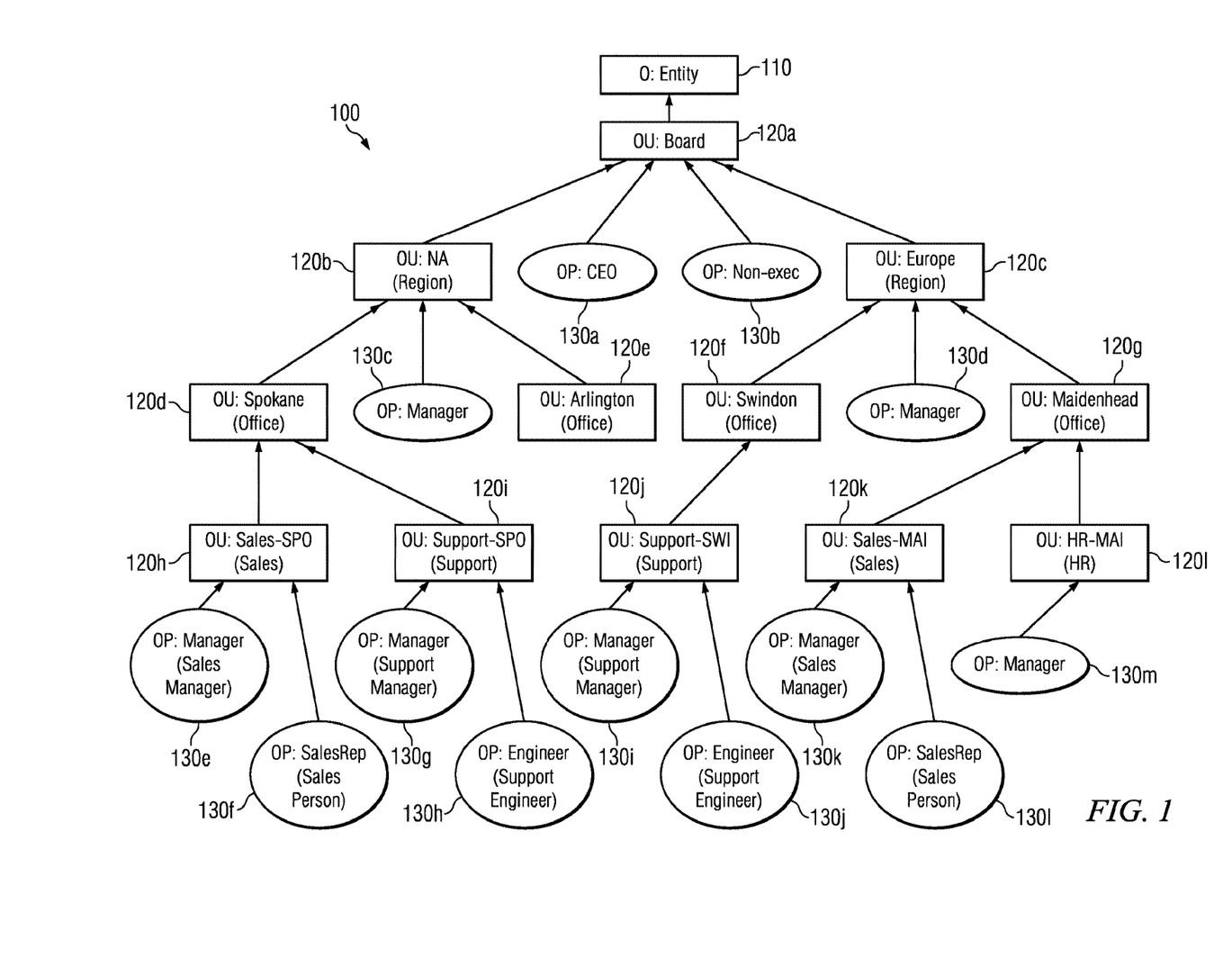
FIG. 1 is a schematic diagram illustrating an example organizational model, in accordance with the present disclosure.

FIG. 1 is a schematic diagram illustrating an example organizational model 100, in accordance with the present disclosure. According to the illustrated embodiment, organizational model 100 may be defined by an organization 110, organizational units 120a-120k ("120"), and organizational positions 130a-130m ("130"). Organization 110 may be subdivided into several organizational units 120, and each organizational unit 120 may include one or more organizational positions 130 that typically work in each respective organizational unit 120.

Generally, an organizational model 100 may be defined using one or more attributes. As used herein, an attribute refers to any type of data that can be used to define an organizational model. Attributes may refer to, but are not limited to, criteria, expressions, fields, types, categorizations, identifiers, qualifiers, data, information, descriptions, or logical relationships that can be used to define an organizational model. Exemplary attributes may include, but are not limited to, the name of an organization 110, the name of an organizational unit 120, the title of an organizational position 130, capabilities of the one or more individuals, locations of the one or more individuals, locations of the one or more organizational units 120, privileges of one or more individuals, experience of one or more individuals, certifications obtained by one or more individuals, specialized skill sets of one or more individuals, a group of individuals having a particular privilege, a group of organizational positions having a particular specialty, etc. An embodiment of a query defined by certain attributes is illustrated in more detail below in FIG. 5.

Organizational model 100 may include departments, teams, positions, roles etc., as well as information relating to relationships between different positions in an organization 110. Organizational model 100 may also be thought of as organizational information. Organizational model 100 may be structured in several ways, but is typically either structured according to the enterprise organizational hierarchy (that which is typically shown in an organization chart) or according to a more traditional role hierarchy, where each role in the hierarchy defines a particular job description. In certain embodiments, organizational model 100 may include elements of both types of structure. Mapping of attributes to the organizational model 100 may change over time as individuals move within the organization 110, join the organization 110, or leave the organization 110. Once capabilities are associated with the organizational model 100, it is possible to define queries against this organizational model 100 that will identify the set of individuals that can complete a piece of work required by a business process.

Organization 110 may refer to the entity associated with the organizational model 100. Organization 110 may include one or more organizational units 120 and one or more organizational positions 130.

Organizational units 120 may refer to the units or sections within an organization 110. In the illustrated embodiment, organization 110 may include organizational unit 120a, which refers to the board of directors. Organization 110 may be divided into two organizational units 120 defined by a location—North America 120b and Europe 120c. The North American organizational unit 120b may be further subdivided into organizational units defined by a more specific location—a Spokane organizational unit 120d and an Arlington organizational unit 120e. The Spokane organizational unit 120d may further subdivided into organizational units defined by roles or functions—a sales organizational unit 120h and a support organizational unit 120i. The Europe organizational unit 120c may be similarly further subdivided into organizational units defined by a more specific location—a Swindon organizational unit 120f and a Maidenhead organizational unit 120g. The Swindon organizational unit 120f may be further subdivided into an organizational unit defined by a role or function—a support organizational unit 120j. The Maidenhead organizational unit 120d may further subdivided into organizational units defined by roles or functions—a sales organizational unit 120k and a human resources organizational unit 120l. Although the embodiment illustrated in FIG. 1 only illustrates organizational units 120 that are defined by locations, functions, or roles, organizational units 120 may be defined by any other type of information or logical relationship that can be used to define organizational model 100.

Organizational positions 130 may refer to more specific roles or job titles associated with each respective organizational unit 120. In the illustrated embodiment, the board of directors organizational unit 120*a* may include two types of organizational positions—a CEO position 130*a* and a non-executive position 130*b*. The North American organizational unit 120*b* may include an organizational position 130*c* for a manager. The European organizational unit 120*c* may also include an organizational position 130*d* for a manger. The Spokane sales organizational unit 120*h* may include two types of organizational positions—a manager 130*e* and a sales representative 130*f*. The Spokane support organizational unit 120*i* may include two types of organizational positions—a manager 130*g* and an engineer 130*h*. The Swindon support organizational unit 120*j* may include two types of organizational positions—a manager 130*i* and an engineer 130*j*. The Maidenhead sales organizational unit 120*k* may include two types of organizational positions—a manager 130*k* and a sales representative 130*l*. The Maidenhead human resources organizational unit 120*h* may include an organizational position for a manager 130*m*. Although the embodiment illustrated in FIG. 1 only illustrates organizational positions 130 that are defined by specific roles or job titles, organizational positions 130 may be defined by any other type of information or logical relationship that can be used to define organizational model 100.

Organizational model 100 illustrates one embodiment for defining an organizational model. One of ordinary skill in the art would appreciate that an organizational model can be defined using different attributes and a different hierarchy than the embodiment of the organizational model 100 illustrated in FIG. 1.

Figure 2:
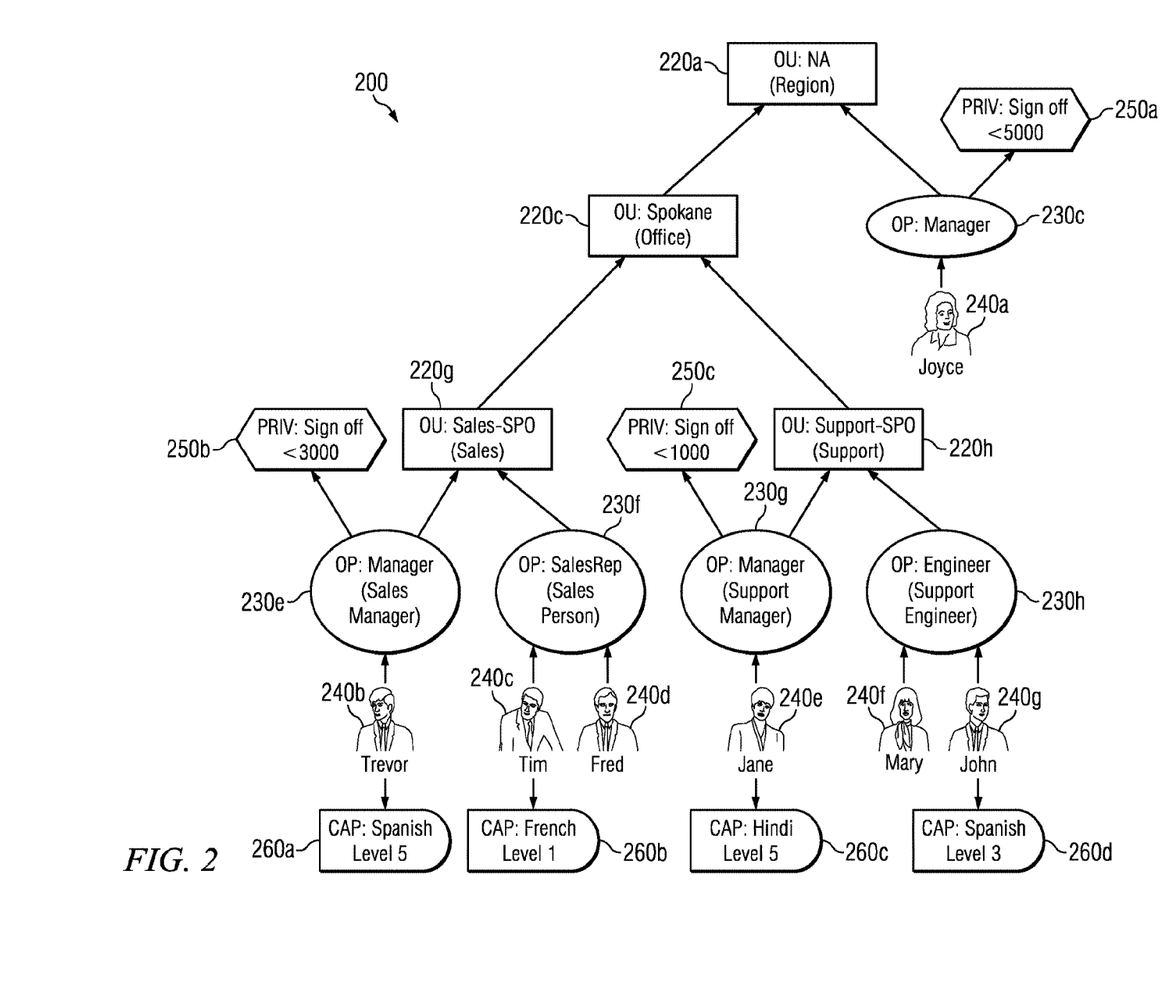
FIG. 2 is a schematic diagram illustrating an example fragment of an organizational model, in accordance with the present disclosure.

FIG. 2 is a schematic diagram illustrating an example fragment of an organizational model 200, in accordance with the present disclosure. According to the illustrated embodiment, organizational model 200 may refer to a fragment of the North American organizational unit 220*u*, which was illustrated as part of a larger organizational model in FIG. 1. Organizational model 200 may be defined by organizational units 220*a*-220*h* ("220"), organizational positions 230*a*-230*h* ("230"), individuals 240*a*-240*g* ("240"), privileges 250*a*-250*c* ("250"), and capabilities 260*a*-260*d* ("260"). Organizational units 220 may include one or more organizational positions 230 that typically work in each respective organizational unit 220. Organizational positions 230 may include one or more individuals 240 whose work is associated with one or more organizational positions 230. Organizational positions 230 may also be further defined by one or more privileges 250. Individuals 240 may be further defined by one or more capabilities 260.

Organizational units 220 may refer to the units or sections within an organizational model 200. In the illustrated embodiment, organizational model 200 includes a North American organizational unit 220*a*. The North American organizational unit 220*a* may be further subdivided into an organizational unit defined by a more specific location—a Spokane organizational unit 220*c*. The North American organizational unit 220*a* may be further subdivided into an organizational unit defined by a more specific location—a Spokane organizational unit 220*c*. The Spokane organizational unit 220*c* may be further subdivided into organizational units defined by roles or functions—a sales organizational unit 220*g* and a support organizational unit 220*h*. Although the embodiment illustrated in FIG. 2 only illustrates organizational units 220 that are defined by locations, functions, or roles, organizational units 220 may be defined by any other type of information or logical relationship that can be used to define organizational model 200.

Organizational positions 230 may refer to more specific roles or job titles associated with each respective organizational unit 220. In the illustrated embodiment, the North American organizational unit 220*b* may include an organizational position 230*c* for a manager. The Spokane sales organizational unit 220*g* may include two types of organizational positions—a manager position 230*e* and a sales representative position 230*f*. The Spokane support organizational unit 220*h* may include two types of organizational positions—a manager position 230*g* and an engineer position 230*h*. Although the embodiment illustrated in FIG. 2 only illustrates organizational positions 230 that are defined by specific roles or job titles, organizational positions 230 may be defined by any other type of information or logical relationship that can be used to define organizational model 200.

Individuals 240 may refer to people who can be identified for working on a particular work item for an organization. Individuals may be further defined by name, email, age, location, experience, etc. In the illustrated embodiment, the North American manager organizational position 230*c* may include one individual 240*a*—Joyce. The Spokane sales manager organizational position 230*e* may include one individual 240*b*—Trevor. The Spokane sales representative organizational position 230*f* may include two individuals 240*c*, 240*d*—Tim and Fred. The Spokane support manager organizational position 230*g* may include one individual 240*e*—Trevor. The Spokane support engineer organizational position 230*h* may include two individuals 240*f*, 240*g*—Mary and John. Although the embodiment illustrated in FIG. 2 only illustrates individuals 240 that are defined by name 230, individuals 240 may be defined by any other type of information or logical relationship that can be used to define organizational model 200. In certain embodiments, an individual may be associated with more than one organizational unit. For example, Trevor 240*b* may have the skill requisites to fill two organizational positions 230—a Spokane sales manager organizational position 230*e* and a Spoken sales representative organizational position 230*f*.

Individuals 240 that are mapped or associated with the organizational model 200 may also have attributes associated with them independently of the organizational model 200 that may then also be combined with the organizational query (e.g., work history, job/skill certification logs, phone number(s), location/address, resource availability at the time the work is to be performed, etc.).

Privileges 240 may refer to rights, access, or responsibilities assigned to a particular organizational position 230. In the illustrated embodiment, the North American manager organizational position 230*c* may be further defined as having a privilege 250*a* to sign off or approve any work items having a value of $3,000 or less. The Spokane sales manager organizational position 230*e* may be further defined as having a privilege 250*b* to sign off or approve any work items having a value of $3,000 or less. The Spokane support manager organizational position 230*g* may be further defined as having a privilege 250*c* to sign off or approve any work items having a value of $1,000 or less. Although the embodiment illustrated in FIG. 2 only illustrates privileges 250 that are defined by having authorization to sign off or approve a work item having a certain value, privileges 250 may be defined by any other type of rights, access, or responsibilities that can be used to define organizational model 200. Although the illustrated embodiment in FIG. 2 only associates privileges 250 with organizational units 230, privileges 250 may be associated with individuals 240 or any other type of data defined by organizational model 200. Organizational model 200 is flexible where any given number and type of attributes can be used to define the structure and logical relationships of organizational model 200.

Capabilities 260 may refer to a skill or other information associated with a particular individual 240. Capabilities may be further defined by proficiency of a language, proficiency of a business application, proficiency of a programming language, possession of certifications, experience, etc. In the illustrated embodiment, the Trevor 240b may have a capability 260a for having a level 5 language proficiency in Spanish. Tim 240c may have a capability 260b for having a level 1 language proficiency in French. Jane 240e may have a capability 260c for having a level 5 language proficiency in Hindi. John 240g may have a capability 260d for having a level 3 language proficiency in Spanish. Although the embodiment illustrated in FIG. 2 only illustrates capabilities 260 that are defined by language proficiencies, capabilities 260 may be defined by any other type of skill or information that can be used to define organizational model 200. In certain embodiments, an individual 240 may be associated with more than one capability 260. For example, John 240g may have also have capabilities 260 of having five years experience in C++ programming and a certification in networking. Although the illustrated embodiment in FIG. 2 only associates capabilities 260 with individuals 240, capabilities 260 may be associated with organizational positions 250 or any other type of data defined by organizational model 200.

As individuals 240 in the organization join or leave a certain position, the position 230 in the organizational model 200 will remain unchanged. A new individual 240 may fill the position, but the required skills and capabilities of that position are not individual-specific. However, the skills, capabilities, and privileges of an individual 240 may be dynamic and may change over time. The organizational model 200 may have elements of a durable organization and elements of a more dynamic organization. For example, an organization may form a project team and that project team may be included in the organizational model 200 for the duration of the project. Team members may come from other positions within the organizational model 200, and for a period of time, the team members may exist in both the durable organizational model and as part of the dynamic project team. Queries made against the organizational model 200 may be able to reference both the durable and more dynamic parts of the organizational model 200.

Organizational model 200 illustrates one embodiment for defining an organizational model. One of ordinary skill in the art would appreciate that an organizational model can be defined using different attributes and a different hierarchy than the embodiment of the organizational model 200 illustrated in FIG. 2.

Figure 3:
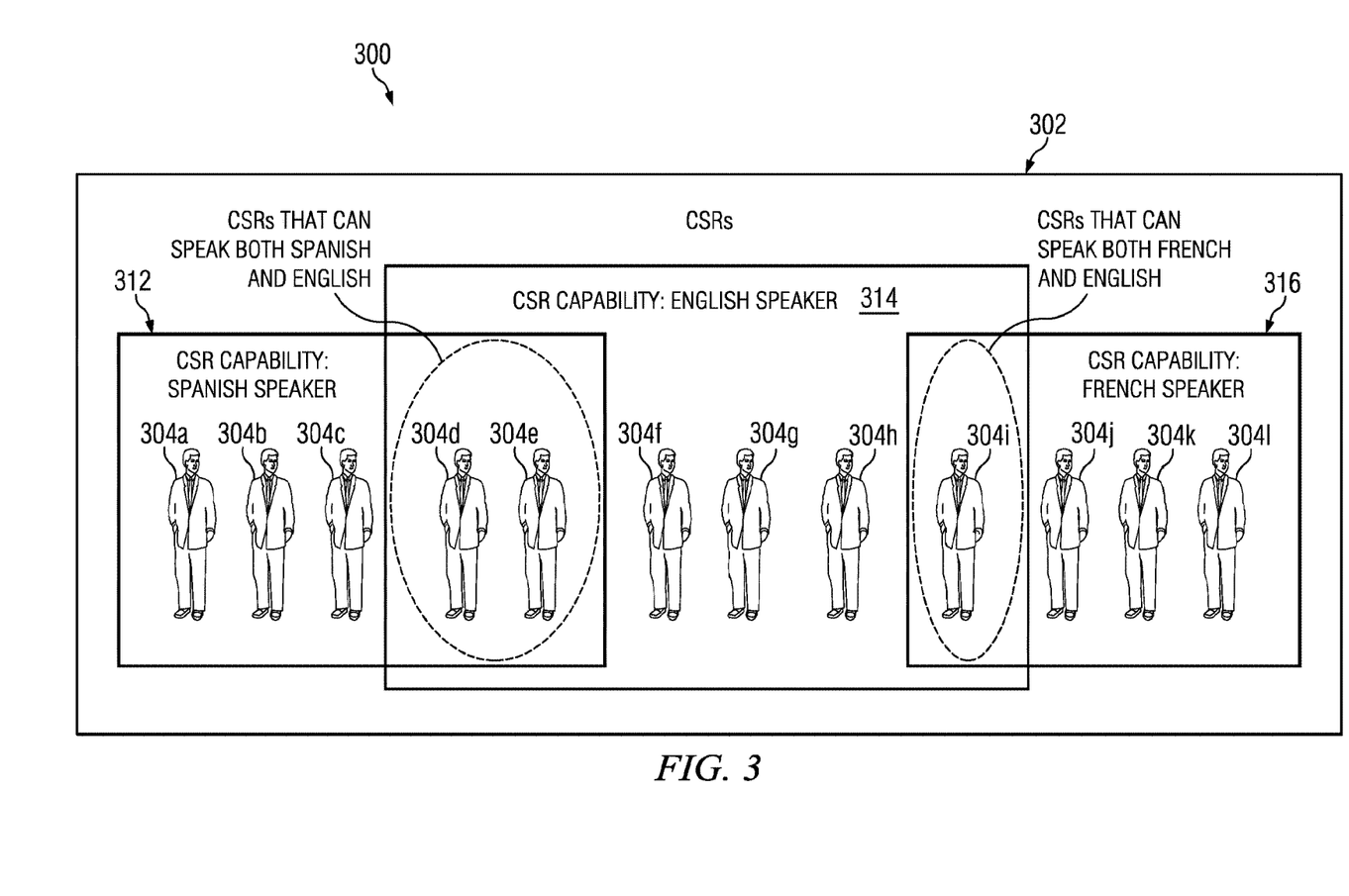
FIG. 3 is a schematic diagram illustrating overlapping capabilities of individuals, in accordance with the present disclosure.

FIG. 3 is a schematic diagram 300 illustrating overlapping capabilities 312, 314, 316 of individuals 304 a-304l ("304"), in accordance with the present disclosure. According to the illustrated embodiment, a group 302 of customer service representatives may be defined by all individuals 304 associated with a customer representative position defined in an organizational model. Individuals 304a-304e may have the capability to speak Spanish. Individuals 304d-304i may have the capability to speak English. Individuals 304i-304l may have the capability to speak French. Individuals 304d, 304e may have the capability to speak both Spanish and English. Individual 304i may have the capability to speak both French and English.

The term "group" 302 as used herein may refer to any logical grouping of any attribute used to define an organizational model. All aspects of the organization model—including, but not limited to, position, department, skill, capability, certification, work history, etc.—may be used to group individuals 304. A group 302 may also be considered an attribute used to define the organizational model. In the illustrated embodiment, group 302 may represent a complete list of individuals associated with the group of customer service representatives. Although not illustrated in FIG. 3, a group may refer to any other logical grouping of any attribute used to define an organizational model. For example, a group may include all of the individuals in an organizational model who have a level 5 proficiency in Spanish and/or all of the individuals who have a particular certification.

Figure 4:
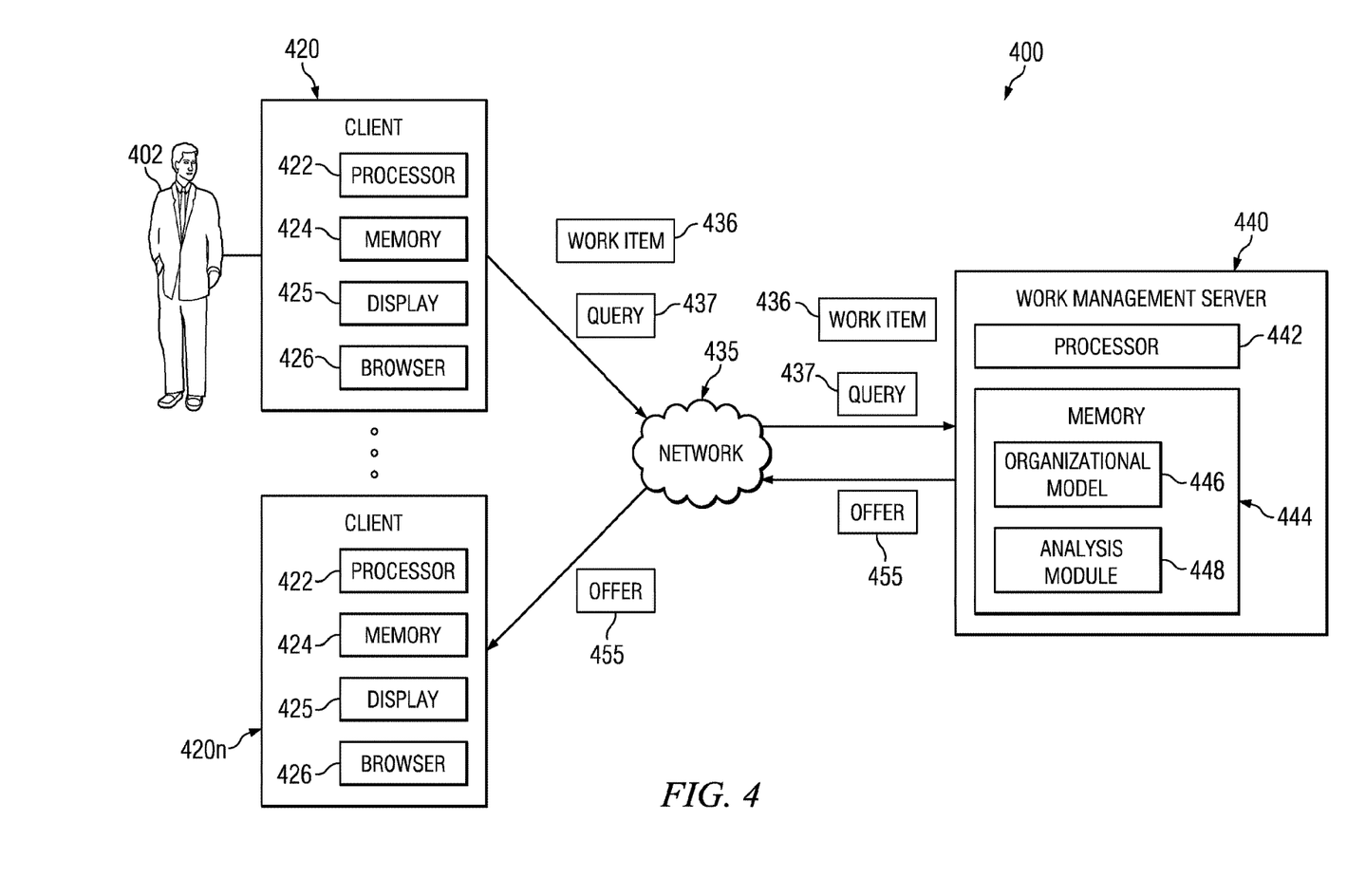
FIG. 4 is a schematic diagram illustrating an example system for identifying individuals to work on a particular work item by querying an organizational model, in accordance with the present disclosure.

FIG. 4 is a schematic diagram illustrating an example system for identifying individuals to work on a particular work item by querying an organizational model, in accordance with the present disclosure. According to the illustrated embodiment, system 400 includes an individual 402, a client 420, a network 435, and a work management server 440. Generally, individual 402 may submit a query 437 having one or more attributes indicating the criteria for one or more individuals to work on a particular work item. Query 437 may be submitted via client 420 to work management server 440. Work management server 440 may execute query 437 by searching an organizational model 446 stored in memory 444 for one or more individuals 402 associated with the attributes defined in query 437. Work management server 40 may identify the one or more individuals 402 associated with the attributes defined in query 437. Work management server 440 may allocate or offer 455 the particular work item to the one or more individuals 402 associated with the one or more attributes defined in query 437.

Individual 402 may interact with client 420 to submit queries 437 to work management server 440 for allocating or offering work items to individuals 402 having the attributes defined in query 437. Individual 402 may be a full-time, part-time, or contract worker for organization. Individual 402 may be a person who assigns work items, or individual 402 may be a person who is allocated or offered work items. In certain embodiments, individual 402 may be a computer or a machine.

Client 420 may represent a general or special-purpose computer capable of performing the described operations. For example, client 420 may include, but are not limited to, mobile devices; cell phones; laptop computers; desktop computers; end user devices; video monitors; cameras; personal digital assistants (PDAs); or any other communication hardware, software, and/or encoded logic that supports the communication of email, web pages, images, videos, text or other suitable forms of data. Client 420 may include one or more input devices such as a keyboard, trackball, mouse, and/or one or more Graphical User Interfaces (GUIs) through which user 402 may interact with the applications running on client 420. Client 420 may include any appropriate combination of hardware, software, and/or encoded logic suitable to perform the described functionality. For example, client 420 may include one or more processors 422 operable to execute computer logic and/or software encoded on tangible media that perform the described functionality. Client 420 may also include memory 424, a display 425, and a browser 426. Client 420 may be communicatively coupled with work management server 440, directly or indirectly, over network 435. System 400 may comprise any appropriate number and type of clients 420.

In some embodiments, client 420 may execute one or more business processes. The business process may be executed by client 420, which creates an automated and efficient mechanism for performing the steps associated with a particular business process. In some embodiments, client 420 may create one or more work items associated with a particular step of a business process. As described below in more detail, client 420 may automatically create one or more queries 437 for each step of a business process, such that each query 437 may define the one or more attributes that are required of one or more individuals 402 to work on particular work items associated with a step of a business process. For example, a sales organization may have a particular business process with respect to how insurance claims are processed. As client 420 is executing this example business process, client 420 may automatically generate a work item and a query 437 for identifying the appropriate individual 402 to perform the work item associated with this particular step of the business process.

Client 420 may include any hardware and/or controlling logic used to communicate information to and from one or more elements illustrated in FIG. 4. For example, client 420 may be operable to receive and process data of different types that may be transmitted via different protocols or formats. Other elements in FIG. 4 may also comprise hardware and/or controlling logic to communicate information to and from one or more elements illustrated in FIG. 4. For example, elements in FIG. 4 may communicate using Hypertext Transfer Protocol (HTTP).

Processor 422 may represent and/or include any form of processing component, including general purpose computers, dedicated microprocessors, or other processing devices capable of processing electronic information. Examples of processor 422 include digital signal processors (DSPs), application-specific integrated circuits (ASICs), field-programmable gate arrays (FPGAs), and any other suitable specific or general purpose processors. Although FIG. 4 illustrates a single processor 422 in client 420, client 420 may include any suitable number of processors 422.

Memory 424 may store processor instructions, browser 426, work items, and/or any other suitable information. Memory 424 may comprise any collection and arrangement of volatile and/or non-volatile components suitable for storing data. For example, memory 424 may comprise random access memory (RAM) devices, read only memory (ROM) devices, magnetic storage devices, optical storage devices, and/or any other suitable data storage devices. In particular embodiments, memory 424 may represent, in part, computer-readable storage media on which computer instructions and/or logic are encoded. Although shown in FIG. 4 as a single component, memory 424 may represent any number of memory components within, local to, and/or accessible by processor 422 and browser 426.

Display 425 may be any hardware operable to display information to individual 402.

Browser 426 may be a software application that is operable to request, process, and display one or more web resources (e.g., a HyperText Markup Language ("HTML") document, a Cascading Style Sheet, an image file, a video file, JavaScript, etc.) associated with a URL. In some embodiments, individual 402 may input queries 437 via browser 426, receive work items via web browser, and/or receiver offers for work items via web browser. In certain embodiments, individual 402 may use an application or email or some other means to input queries 437, receive work items, and/or receiver offers 455 for work items.

Network 435 may represent any form of communication network supporting circuit-switched, packet-based, and/or any other suitable type of communications. Network 435 may additionally include any other components of system 400 capable of transmitting and/or receiving information over a communication network, including client 420, and/or work management server 440. Although shown in FIG. 4 as a single element, network 435 may represent one or more separate networks (including all or parts of various different networks) that are separated and serve different respective elements illustrated in FIG. 4. Network 435 may include routers, hubs, switches, firewalls, content switches, gateways, call controllers, and/or any other suitable components in any suitable form or arrangement. Network 435 may include, in whole or in part, one or more secured and/or encrypted Virtual Private Networks (VPNs) operable to couple one or more network elements together by operating or communicating over elements of a public or external communication network. In general, network 435 may comprise any combination of public or private communication equipment such as elements of the public switched telephone network (PSTN), a global computer network such as the Internet, a local area network (LAN), a wide area network (WAN), or other appropriate communication equipment.

Work item 436 may be in the form of one or more data types that may be worked on by one or more individuals 402. In some embodiments, client 420 may generate one or more work items 436 associated with one or more business processes. In some embodiments, one or more work items 436 may be generated by one or more individuals 402.

Query 437 may be one or more data types (e.g., an expression with boolean operators and conditions) defining the one or more attributes that are required of one or more individuals to work on a particular work item. Query 437 may be combinatorial logic involving objects of one or more data types. Query 437 may include any attribute associated with an individual that has been defined in the organizational model 446 stored at work management server 440. Queries may be in the form of a text string. Queries may use any type of operator, including, but not limited to, "+", "−", "*", "/", "=", "!", "<", ">", "and", "or", "not", "(", ")", "|", "[", "]", "{", "}", etc. Queries may also use keywords, including, but not limited to, "O", "Organization", "OU", "Organizational Unit", "OP", "Organizational Position", "P", "Privilege", "C", "Capability", "L", "Location", "G", "Group", "XP", "Experience", etc. queries may be inputted in any suitable manner, including, but not limited to email, text files, web pages, GUIs, etc. In certain embodiments, queries may only utilize predefined attributes that have been defined in organizational model. In some embodiments, client 420 may generate one or more queries 437 associated with one or more work items for one or more business processes. In some embodiments, one or more work items 437 may be generated by one or more individuals 402. For example, a web page or GUI may generate a query 437 by utilizing a pull down menu having one or more selection options, which are pre-populated with the attributes that were used to define the organizational model 446. An embodiment of query 437 is illustrated in more detail below in FIG. 5.

In some embodiments, queries 437 may also be defined by dynamic resource attributes (e.g., time-of-day, recent workload, etc.). Defining queries 437 using these attributes may help businesses ensure that each individual 402 stays certified in their position's skills and capabilities. For example, if an individual 402 must complete a certain type of task a defined number of times on an annual basis to maintain a certification, a query 437 may be executed to determine those individuals 402 near the end of a certification period and a scheduler may ensure that they are given higher priority for the requisite tasks. Work management server 440 may also take into account work that has been previously done in the query 437. For example, a query 437 may be used to determine an individual 402 (or group of individuals 402) with a particular certification and closest to requiring re-certification. Individuals 402 may not be using skills enough to maintain certification (not current).

Although FIG. 4 illustrates that both work items 436 and queries 437 are generated and transmitted by client 420, in certain embodiments, the work items 436 and/or queries 437 may be generated and transmitted by a different device in system 400. Although FIG. 4 only illustrates one client 420 generating and transmitting work items 436 and queries 437, in certain embodiments, multiple clients 420 may concurrently generate and transmit one or more work items 436 and queries 437.

Work management server 440 may receive query 437, execute query 437, search organizational model 446 for one or more individuals 402 associated with the attributes defined in query 437, identify one or more individuals 402 in organizational model 446 associated with the attributes defined in query 437, and allocate or offer 455 a work item to one or more individuals 402 having the attributes defined in query 437. Work management server 440 may be any suitable computing device comprising a processor 442 and a memory 444. Work management server 440 may also include an organizational model 446 and analysis module in memory 444. Work management server 440 may comprise one or more machines, workstations, laptops, blade servers, server farms, and/or stand alone servers. Work management server 440 may be operable to communicate with client 420 in any suitable manner. For example, work management server 440 may be operable to receive a query via a web page and transmit a work item or an offer for a work item to one or more individuals 402 or one or more clients 420 or any other device.

Work management server 440 may include any hardware and/or controlling logic used to communicate information to and from one or more elements illustrated in FIG. 4. For example, work management server 440 may be operable to receive and process data of different types that may be transmitted via different protocols or formats. Other elements in FIG. 4 may also comprise hardware and/or controlling logic to communicate information to and from one or more elements illustrated in FIG. 4. For example, elements in FIG. 4 may communicate using Hypertext Transfer Protocol (HTTP).

Processor 442 may represent and/or include any form of processing component, including general purpose computers, dedicated microprocessors, or other processing devices capable of processing electronic information. Examples of processor 442 include digital signal processors (DSPs), application-specific integrated circuits (ASICs), field-programmable gate arrays (FPGAs), and any other suitable specific or general purpose processors. Although FIG. 4 illustrates a single processor 442 in work management server 440, work management server 440 may include any suitable number of processors 442.

Memory 444 may store processor instructions, organizational model 446, analysis module 448, work items, and/or any other suitable information. Memory 444 may comprise any collection and arrangement of volatile and/or non-volatile components suitable for storing data. For example, memory 444 may comprise random access memory (RAM) devices, read only memory (ROM) devices, magnetic storage devices, optical storage devices, and/or any other suitable data storage devices. In particular embodiments, memory 444 may represent, in part, computer-readable storage media on which computer instructions and/or logic are encoded. Although shown in FIG. 4 as a single component, memory 444 may represent any number of memory components within, local to, and/or accessible by processor 442.

Organizational model 446 may be any type of data or data structure that defines an organization using attributes. An embodiment of organizational model 446 is illustrated in more detail above in FIGS. 1 and 2. In some embodiments, organizational model 446 will include at least one individual. Organizational model 446 may be defined and stored using any suitable method, including, but not limited to, tree data structures, hierarchical structure, non-hierarchal structure, sub-classes, and/or super-classes, etc. Organizational model 446 may be stored in any suitable format, including, but not limited to, a relational database, a spreadsheet, a text file, etc.

Analysis module 448 may represent any appropriate combination of logic and/or software suitable to perform the described functions. Analysis module 448 may use any suitable methods to execute query 437, search organizational model 446 for one or more individuals 402 associated with the attributes defined in query 437, identify one or more individuals 402 in organizational model 446 associated with the attributes defined in query 437, and allocate or offer 455 a work item to one or more individuals 402 having the attributes defined in query 437. For example, analysis module 448 may be operable to extract the appropriate data from query to search organizational model 446. Analysis module 448 may be further operable to search organizational model and identify one or more individuals in organizational model associated with the one or more attributes defined in query 437 using any suitable search algorithms or search data structures. In an embodiment, analysis module 448 is provided to allow individuals 402 the ability to create, monitor, and modify process definitions, and to automate the execution of those processes and workflows. In doing so, analysis module 448 allows for passing work items onto the appropriate individual 402.

In some embodiments, analysis module 448 may also be used for dynamic work-item allocation. Analysis module 448 may determine that a particular piece of work should go to a particular individual 402 at the time the individual 402 becomes available. Assigning work to individuals 402 and then later reallocating this work based on worker availability (taking work from one worker and giving it to another worker) is time-consuming and expensive. A conventional work item allocation method assigns work to a worker at the time it arrives. This may lead to resource work load that is out of balance, which in turn requires expensive, often manually performed, periodic rebalancing.

In some embodiments, analysis module 408 may execute query 437 for a particular work item at a particular time that the work item is scheduled to be perform, and timely allocate the work item to individual 402 meeting the criteria defined in query 437.

In some embodiments, analysis module 408 may evaluate queries for work that is to be offered to a previously identified set of resources that may either be performed statically (at the point the work is scheduled to be started) or at the point an individual 402 looks at their work list (in other words looks at the current snapshot of the work they can perform), or is given the next piece of work that the individual 402 is to perform if they are not given work selection autonomy.

In some embodiments, queries 437 may also be executed against the organizational model 446 in conjunction with the capabilities for which people assigned to different positions in the model need, to define the current set of people who are capable to do a piece of work. If an individual 402 needs to do a piece of work four times for any 12-month period, then analysis module 448 may allocate the work to the right individual 402 so that the workers in positions requiring certifications may stay current with their certifications. Thus, in an embodiment, analysis module 448 may use work history (e.g., how many times a worker has performed a type of work) in conjunction with the attributes defined in the query to allocate work items.

As discussed above, once a query 437 is defined, the results are not static. Individuals 402 may satisfy a query at one point and not at another (and vice versa). Individuals 402 may move from position to position. Individuals 402 may also attain new skills or lose a certification for a skill. Teams and departments may grow and shrink. Every time the query 437 is reevaluated, it may identify a new set of individuals 402 for the work item.

Offer 455 for a work item, allocation of a work item, or a work item itself may be in the form of one or more data types. For example, offer 455 for a work item, allocation of a work item, or the work item itself may be attached to or embedded in an email, text files, web pages, GUI, etc. that is sent to one or more individuals 402 or one or more clients 420. A work item may remain unallocated until the work item has been allocated to an individual or until an individual has accepted offer 455 to work on the work item.

Work management server 440 and client 420 may represent any appropriate combination of hardware and/or software suitable to perform the described functions. Some embodiments of the disclosure may include logic and/or software contained within a medium. The medium may include RAM, ROM, or disk drives. The medium may be non-transitory. In some embodiments, the logic and/or software may be contained within a hardware configuration. The logic and/or software may also be embedded within any other suitable medium without departing from the scope of the disclosure. For example, analysis module 448 may be logic and/or software stored and encoded on tangible, computer-readable media and executed on processor 442 and/or other computer hardware suitable to instruct work management server 440 to perform the described functions.

In operation, individual 402 or system 400 may create query 437 defined with one or more attributes indicating the criteria for one or more individuals to work on a particular work item. Work management server 440 may receive query 437, and execute the expression of query 437. Next, work management server 440 may search organizational model 446 for the one or more individuals 402 associated with the attributes defined in the expressions in query 437. Work management server 440 may identify the one or more individuals 402 associated with the attributes defined in the query, and allocate or offer 455 the particular work item to the one or more of the individuals 402 associated with the one or more attributes defined in query 437.

If organizational model is modified (e.g., an individual joins, leaves, or switches positions in an organization), work management server 440 may perform a new search the organizational model 446 to identify a new set of one or more individuals 402 associated with the one or more attributes defined in the previously received query 437, if the work item has not been allocated to an individual 402. Work management server may allocate or offer 455 the unallocated work item to one or more individuals 402 associated with the one or more attributes.

In another example, organizational model 440 may be defined by an organizational unit called development team may have two organizational positions: (1) engineer; and (2) manager. The engineer position may be filled with a multitude of individuals 402 (e.g., 20 engineers). The manager position may have certain privileges (e.g., sign-off work privileges). A query 437 may be defined in terms of the organizational model 446 in order to allocate or offer 455 work. Continuing with the development team example above, a query 437 may be defined for a piece of work that needs to be done by the development team and needs approval by a manager (e.g., the query would return the manager organizational position). Or a query 437 may be defined to determine the individuals in the engineering organizational position in order to allocate a piece of work to be done by an individual 402 in the organization position of engineering.

A more complicated query 437 may also be defined. For example, a query 437 may be based on capabilities, group memberships, organizational units, and memberships (e.g., a query 437 may be written to allocate work to a member of engineering team, who has privilege of signing off work, and also has capability of level-3 project manager, and is a member of the architecture group, this being a role fulfilled by all of the senior designers in the organization). A query 437 may be defined to a very complex level, as long as the query 437 is defined in terms of the model.

Figure 5:
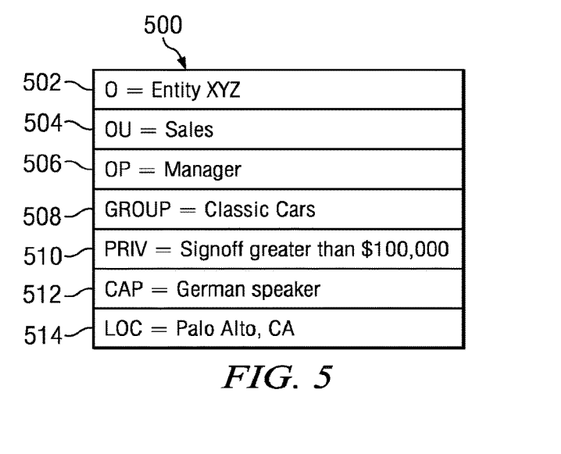
FIG. 5 is a schematic diagram illustrating an example query defined in terms of attributes associated with an individual who can work on a particular work item, in accordance with the present disclosure.

FIG. 5 is a schematic diagram illustrating an example query 500 defined in terms of attributes 502, 504, 506, 508, 510, 512, 514 associated with an individual who can work on a particular work item, in accordance with the present disclosure. A work item may come to a global automobile organization named entity XYZ from a German speaking customer living in Palo Alto, Calif. who wants to buy a classic car valued over $125,000. A query 500 can be quickly created to locate the appropriate individual in the organization to appropriate service this customer's needs. Example query may be created by selecting an individual having the following attributes: works at automobile organization entity XYZ 502; works in a sales organizational unit 504; has a manager position 506; is associated with the group having knowledge of classic cars 508; has privileges to sign off on a purchase greater than $100,000; has capability to speak German 512; and located in Palo Alto, Calif. 514.

Figure 6:
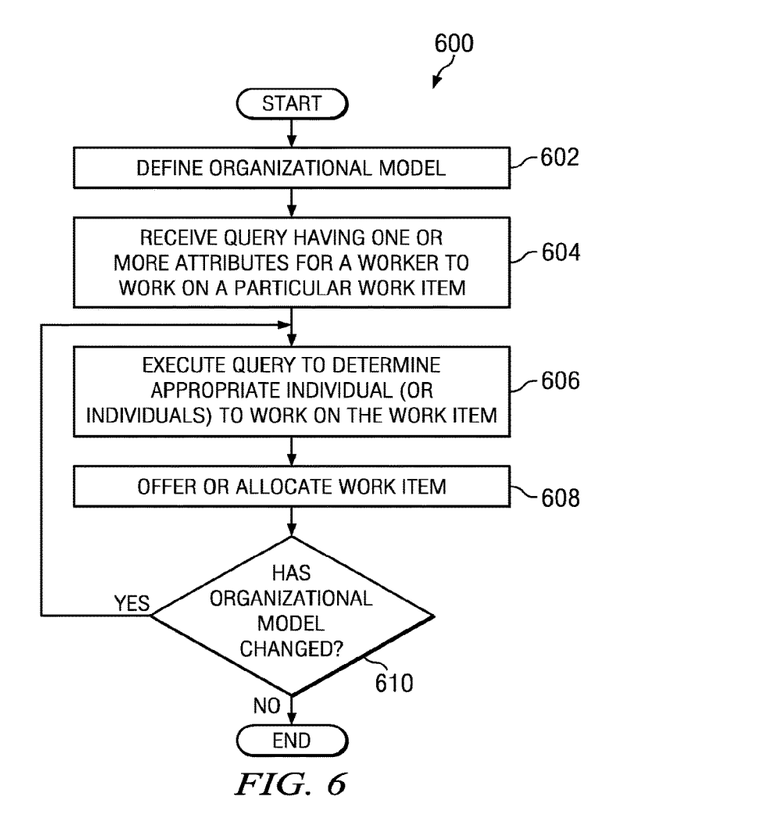
FIG. 6 is a flow diagram illustrating an embodiment for identifying individuals to work on a particular work item, in accordance with the present disclosure.

FIG. 6 is a flow diagram 600 illustrating an embodiment for identifying individuals to work on a particular work item, in accordance with the present disclosure. In the illustrated example, flow diagram 600 begins at step 602 when someone or some device defines an organizational model in terms of attributes. At step 604, work management server may receive a query having one or more attributes for a worker to work on a particular work item.

At step 606, work management server may execute the query to determine the appropriate individual or individuals to work on the work item. For example, work management server may search organizational model for the one or more individuals associated with the attributes defined in the expressions in query. Work management server may identify the one or more individuals associated with the attributes defined in the query.

At step 608, work management server may allocate or offer the particular work item to the one or more of the individuals associated with the one or more attributes defined in query. In some embodiments, if the work management server identifies three different individuals to perform a particular work item, then the work management server may offer the work item to each individual and wait for one of the individuals to proactively select the work item, upon which the work item is allocated to that particular individual. In some embodiments, if the work management server identifies three different individuals to perform a particular work item, then the work management server may push a work item notification to one of these three individuals and give that individual a finite time period to accept the work item before offering it to another individual. In some embodiments, if the work management server identifies three different individuals to perform a particular work item, then the work management server may push the work item itself to one of the three individuals and allocate the work to this particular individual.

At step 610, the work management server may determine if the organizational model has changed (e.g., an individual joins, leaves, or switches positions in an organization). If the organizational model has not changed, then work management server does not need to reevaluate the query and the flow diagram stops.

If the organizational model has changed (and/or if the work item has not been allocated), the flow diagram returns to step 606 where the work management server may reevaluate the query again. The work management server may perform a new search on the organizational model to identify a new set of one or more individuals associated with the one or more attributes defined in the previously received query. The flow diagram continues to step 608 where the work management server may allocate or offer the unallocated work item to one or more individuals associated with the one or more attributes.

The steps illustrated in FIG. 6 may be combined, modified, or deleted where appropriate, and additional steps may also be added to those shown. Additionally, the steps may be performed in any suitable order without departing from the scope of the present disclosure.

Figure 7:
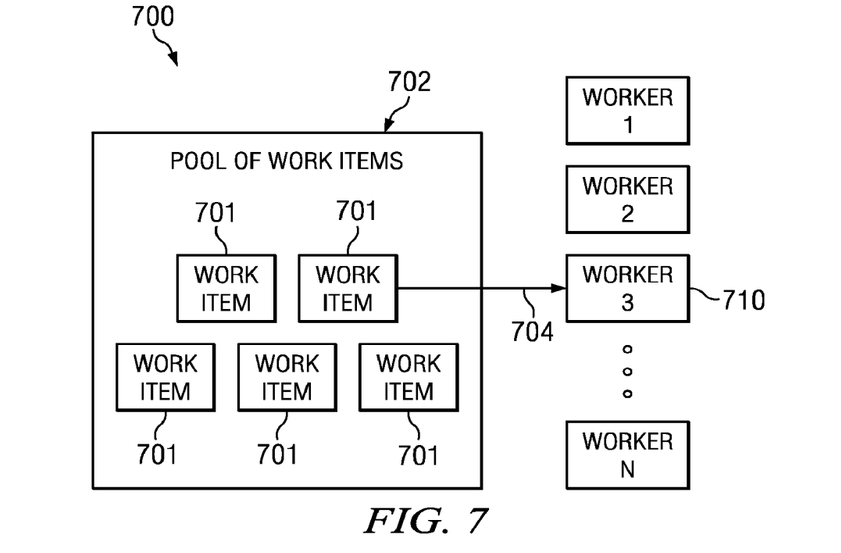
FIG. 7 is a schematic diagram illustrating an embodiment for allocating or offering work items to one or more individuals, in accordance with the present disclosure.

FIG. 7 is a schematic diagram 700 illustrating allocation of work items 701. In an embodiment, a mechanism is disclosed for allocating one or more work items 701 based on the criteria of the work items 701 to one or more workers 710, at the point the one or more workers 710 become available. In some embodiments, the allocated work item 701 may be the highest priority work at that point in time.

Work items 301 may be collected in a holding area 702 and monitored over time because the priority of the work item 701 may change over time. When a worker 710 is available, the work management server may take a work item 701 out of the pool 702 of work items 701 and allocate the work item 701 to the most appropriate available worker 710 at that time.

In some embodiments, the work management server may consider numerous criteria including, but not limited to, work item priority, worker skills, position, a worker's work history (certification requirements), etc. If a particular worker 710 has an affinity for a particular type of work item 701, then that worker 710 may receive the task.

In some embodiments, the work management server may be able to assign work dynamically as workers 710 become free (or "just-in-time"), picking the best work item 701— based on a variety of criteria—from a single queue to assign to the available worker 710. This may require more computation at the time a worker 710 is available, but provides more accurate assignments and substantially eliminates the need to rebalance multiple worker queues.

Figure 8:
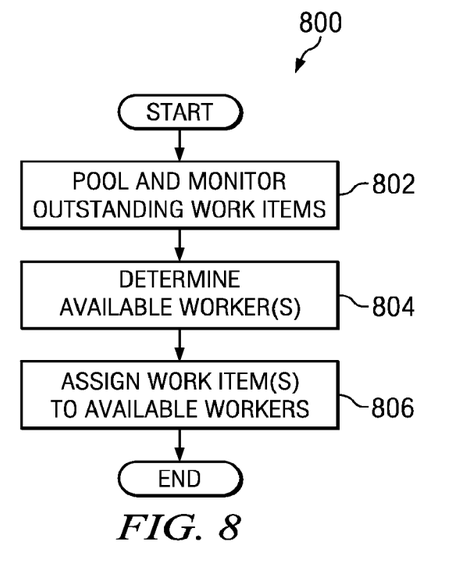
FIG. 8 is a flow diagram illustrating an embodiment for allocating or offering work items to one or more individuals, in accordance with the present disclosure.

FIG. 8 is a flow diagram 800 illustrating allocation of work items. The flow diagram may start at step 802 where work items are collected and monitored in a holding area. At step 804, work management server may determine available workers to work on work items as the workers become available. At step 806, a work item is taken from the pool and allocated to the available worker.

The steps illustrated in FIG. 8 may be combined, modified, or deleted where appropriate, and additional steps may also be added to those shown. Additionally, the steps may be performed in any suitable order without departing from the scope of the present disclosure.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A system for using a state-changing dynamic data structure, the system comprising:
   a memory, the memory comprising the state-changing dynamic data structure; and
   a processor in communication with the state-changing dynamic data structure, the processor operable to:
   receive a query, wherein the query comprises one or more attributes indicating criterion for transmitting a particular data item of a plurality of data items to one or more targets, wherein the query comprises combinatorial logic associated with one or more objects, wherein the one or more attributes comprises one or more dynamic resource attributes;
   extract the one or more attributes from the received query;
   perform a first search in the state-changing dynamic data structure for one or more targets associated with the one or more attributes extracted from the query;
   identify a first set of one or more targets associated with the one or more attributes extracted from the query based on the first searching;

determine priority of the plurality of data items;
transmit a first data item as the particular data item to each target of the first set of one or more targets identified as being associated with the one or more attributes extracted from the query, wherein the first data item has the highest priority among the plurality of data items at a first state of the state-changing dynamic data structure;
determine whether the state-changing dynamic data structure has transformed from a first state to a second state; and
in response to a determination that the state-changing dynamic data structure has transformed from the first state to a second state;
perform a second search in the state-changing dynamic data structure, and identify, based on the second search, a second set of one or more targets associated with the one or more attributes extracted from the query,
determine the priority of the plurality of data items, and
transmit a second data item as the particular data item to each target of the second set of one or more targets identified as being associated with the one or more attributes extracted from the query, wherein the second data item has the highest priority among the plurality of data items at the second state of the state-changing dynamic data structure;
wherein the transmitting the particular data item to the first set of one or more targets comprises:
pushing, to a first identified target in the first set of one or more identified targets associated with the one or more attributes extracted from the query, a first notification of an option to select the particular data item within a first finite time period, the selection of the particular data item being made for processing the particular data item, and
pushing, to a second identified target in the first set of one or more identified targets associated with the one or more attributes extracted from the query, a second notification of an option to select the particular data item when the particular data item is not selected by the first identified target within the first finite time period, the selection of the particular data item being made for processing the particular data item.

2. The system according to claim 1, wherein the system is further operable to:
search the state-changing dynamic data structure for a new set of one or more targets associated with the one or more attributes extracted from the query if the state-changing dynamic data structure has been determined to have been modified and the particular data item has not been selected by a target; and
transmitting the particular data item to one or more targets from the new set of one or more targets.

3. The system according to claim 1, wherein the one or more attributes extracted from the query comprises a logical relationship that is used to define the state-changing dynamic data structure.

4. The system according to claim 1, wherein the system is further operable to automatically allocate one or more particular data items to the one or more targets associated with the one or more attributes, as the one or more targets become available to process the one or more particular data items.

5. The system according to claim 1, wherein the processor comprises an application-specific integrated circuit.

6. The system according to claim 1, wherein the processor comprises a specific purpose processor.

7. The system according to claim 1, wherein the system comprises a special purpose computer system.

* * * * *